United States Patent

Bartlett

[15] 3,663,950

[45] May 16, 1972

[54] QUAD AC POWER SWITCH WITH SYNCH

[72] Inventor: Peter G. Bartlett, Davenport, Iowa

[73] Assignee: Struthers-Dunn, Inc., Pitman, N.J.

[22] Filed: Jan. 19, 1970

[21] Appl. No.: 3,801

[52] U.S. Cl. ....................323/24, 307/133, 307/215, 307/252 T, 307/252 UA

[51] Int. Cl. ....................G05f 5/00

[58] Field of Search ....................323/22 SC, 22 ZS, 24; 307/252.21, 252.73, 252.74, 215, 133

[56] References Cited

UNITED STATES PATENTS

| | | | |
|---|---|---|---|
| 3,283,179 | 11/1966 | Carlisle et al. | 307/252.73 X |
| 3,354,377 | 11/1967 | Leeds, Jr. | 321/8 |
| 3,358,238 | 12/1967 | Shapiro et al. | 307/215 X |
| 3,365,654 | 1/1968 | Johnston | 323/22 ZS |
| 3,450,891 | 6/1969 | Riley | 307/133 |
| 3,492,512 | 1/1970 | Eckl | 307/252.73 X |
| 3,491,283 | 1/1970 | Johnston | 323/22 ZS |

*Primary Examiner*—Gerald Goldberg

*Attorney*—William D. Hall, Elliott I. Pollock, Fred C. Philpitt, George Vande Sande, Charles F. Steininger and Robert R. Priddy

[57] ABSTRACT

Circuit for controlling the energization of an alternating-current load in which the load is electrically isolated from the controlling input. Energization of the load is controlled by a bi-directional thyristor whose gate electrode is energized with a high frequency, square-wave voltage provided by a pair of interconnected NAND gates. A synchronizing signal obtained from the alternating-current power source controls the NAND gates so that they become effective to produce a square-wave signal for the gate electrode of the thyristor as the alternating-current source goes through zero amplitude, and the thyristor again becomes cut off when the current through the load approaches zero, with the result that switching of the load is timed to occur when it will produce the fewest transients and noise throughout the system.

2 Claims, 2 Drawing Figures

INVENTOR

Peter G. Bartlett

BY Hall, Pollock & Vande Sande

ATTORNEY

INVENTOR
Peter G. Bartlett

BY Hall, Pollock & Vande Sande
ATTORNEY

QUAD AC POWER SWITCH WITH SYNCH

BACKGROUND OF THE INVENTION

In various types of industrial control systems and processes, it is necessary to control apparatus in response to input signals or to respond to events or changes in conditions of apparatus, for example, and to record such events or occurrences or to provide visual indications of their occurrences. Quite often, the event or condition or control input which is to be monitored or made effective in the system occurs in logic circuitry or the like where signals are at a low level so that it becomes exceedingly important that a high degree of noise immunity be built into such a system to prevent its improperly responding to transients and noise. Quite frequently also the apparatus to be controlled operates at much higher electrical power levels and frequently includes operation of devices by an alternating-current source, thereby aggravating the tendency to generate noise and transient signal.

It is a purpose of this invention to provide circuit means for the control of the alternating-current energization of a load device in response to a low-level signal, and with complete electrical isolation being provided between the alternating-current load and the low-level input circuit. The circuit organization is so designed and constructed as to minimize the generation of transients and noise which may adversely affect other circuits.

SUMMARY OF THE INVENTION

According to the invention, energization of the alternating-current load is directly controlled by a bi-directional thyristor. Such a thyristor has two anodes which are series connected with the load. Normally the thyristor acts as an open switch; however, if its gate electrode voltage becomes more positive or more negative than the associated anode by a predetermined minimum amount, the thyristor will conduct alternating-current. Once the thyristor becomes conductive the control gate becomes ineffective to render it nonconductive, and the thyristor can thereafter become nonconductive only when its anode current becomes less than a predetermined minimum value.

In accordance with the present invention, the gate electrode is energized by a square-wave signal. The latter signal is generated by means of a pair of cross-connected NAND gates which are arranged to operate in a fashion similar to that of a free-running multi-vibrator whenever they receive an enabling input. Initiation of operation of the two NAND gates to provide the square-wave signal is in appropriately timed relationship to the waveform of the alternating-current voltage source, and the phase relationships are so selected that the thyristor can be triggered to its ON condition only at substantially the time that the alternating-current power source is going through its zero amplitude point. The turning off of the thyristor is caused to occur only when the current in the load reaches a sufficiently low level so that conduction in the thyristor can no longer be sustained. As a result, the switching on and off of the thyristor is timed to occur when it will produce a minimum of disturbance in any associated logic circuitry. Moreover, the circuit organization is one which provides complete electrical isolation between the input and the output through a pulse transformer.

BRIEF DESCRIPTION OF THE DRAWINGS

In describing the invention, reference will be made to the accompanying drawings in which.

DETAILED DESCRIPTION OF THE PREFERRED EMBODIMENT

Figure 1:
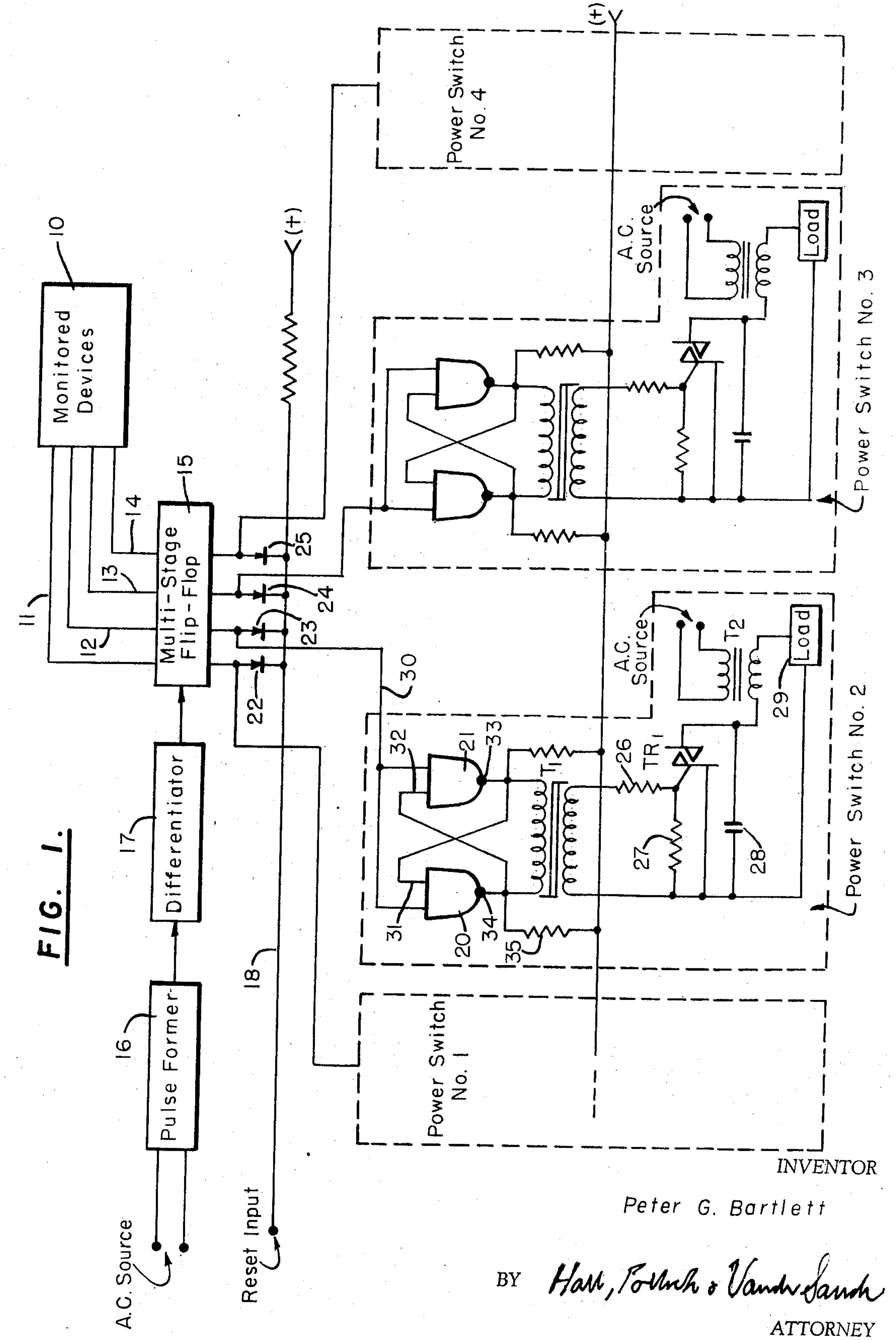
FIG. 1 is a circuit diagram, partly in block form, of a typical embodiment of this invention.

Referring to FIG. 1, the preferred embodiment is disclosed in connection with the monitoring of various input devices which, in FIG. 1, have been diagrammatically illustrated by the block designated as monitored devices 10. Such devices may comprise, for example, a plurality of relay contacts, the outputs of photocells, or any other appropriate devices which may assume either of two distinctive conditions. It will be understood that such monitored devices may form part of a complete control system and may be included in logic circuitry which is particularly adapted for the control and/or the surveillance of a complete system or process.

Figure 2:
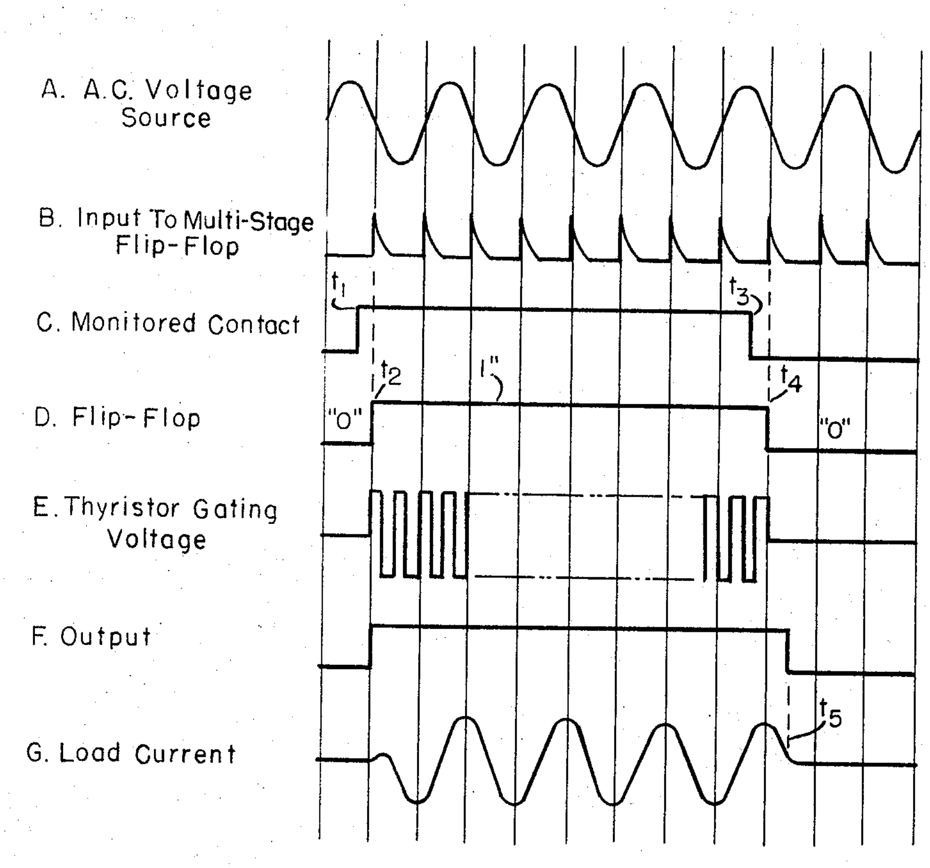
FIG. 2 is a waveform diagram illustrating phase relationships occurring in various parts of the system.

The various monitored devices each provide a signal over the respective leads 11–14 to a multi-stage flip-flop 15. The flip-flop 15 also receives an input from pulse former 16. Pulse former 16 and differentiator 17 are controlled by an alternating-current source, and a series of discrete trigger pules is produced each of which is timed to occur substantially whenever the waveform of the AC source goes through zero amplitude. Thus, two pulses are provided by pulse former 16 for each complete cycle of the AC source. In FIG. 2, it will be noted that each trigger pulse occurs substantially in phase with the zero points of the waveform of alternating-current voltage as shown at line A.

The flip-flop 15 comprises a plurality of individual flip-flop stages, one for each of the monitored devices 10. Thus, as shown in FIG. 1, where it is assumed that there are four different devices to be monitored, each providing a distinctive one of two signals on the leads 11–14, respectively, the flip-flop 15 will similarly be provided with four stages. As will be known to one skilled in the art, such a flip-flop includes internally the required circuitry to provide that each stage will assume the "0" or "1" state upon the occurrence of a trigger pulse such as appears at line B of FIG. 2 and then will retain such last-operated state until the occurrence of the next such trigger pulse, at which time each stage will again be controlled in accordance with whether that stage is then receiving a "0" or "1" input from the monitored devices 10. As an example, if it is assumed that the monitored devices 10 comprise a plurality of relay contacts and that the contacts associated with leads 11 and 12 are closed at a given instant whereas the contacts associated with leads 13 and 14 are open at the same instant, it may then be considered that the leads 11 and 12 each provide a "1" output whereas leads 13 and 14 provide a "0" output. Upon the next occurrence of a trigger pulse from differentiator 17, the respective stages of flip-flop 15 will then be operated in such manner that the stages associated with input leads 11 and 12 will both be operated to their "1" condition whereas the two stages associated with leads 13 and 14 will be operated to the "0" condition. Each stage of the flip-flop will retain this last-operated state until the occurrence of another trigger pulse when again each stage will be operated in accordance with the output it is then receiving on input leads 11–14.

Associated with each stage of the flip-flop is a power switch. Four such power switches have been illustrated in respective blocks in FIG. 1, but only two such power switches have been shown in detail. It will of course be evident that the power switches numbered 1 and 4 are identical to power switches numbered 2 and 3.

Referring more particularly now to power switch No. 2, it can be seen that this comprises two cross-coupled NAND gates 20 and 21, both of which receive an input from the output of an associated stage of flip-flop 15. Incidentally, the various diodes 22–25 are provided so as to give the required isolation among the several outputs of flip-flop 15 and yet permit each to be connected to a reset input lead 18 for purposes to be later described.

The outputs of NAND gates 20 and 21 are respectively connected to opposite terminals of the primary winding of a pulse transformer T1, and the secondary of this transformer has connected in parallel therewith two resistors 26 and 27 whose junction is connected to the gate electrode of a bi-directional thyristor TR1. The output of each gate is also connected through a resistor to a source of positive voltage such as the connection provided for the output of gate 20 through resistor 35 to the terminal (+). The left-hand terminal of the secondary winding of transformer T1 is connected to one anode terminal of the thyristor, and it will be noted that a capacitor 28 is connected also in parallel with the output of thyristor TR1. The function of capacitor 28 is to suppress transients in the load circuit. The output circuit of thyristor TR1 includes in series connection the secondary winding of a transformer T2 whose primary winding is connected to the alternating-current source and also the load 29.

The output from the corresponding stage of flip-flop 15 and appearing on lead 30 may be either at substantially zero voltage representative of a "0" output or a positive voltage which is representative of a "1" output from the flip-flop. Assuming first that the input on lead 30 is substantially at zero voltage corresponding to a "0" binary input, both gates then provide a positive output since such a NAND gate will provide a zero output only when both input terminals have a positive voltage applied thereto. By reason of the cross-coupling between the two gates, the second input of each NAND gate must be a positive voltage. With each NAND gate then receiving both a positive input voltage from the output of the other gate and a zero voltage input from lead 30, each continues to provide a positive voltage output and both remain in that state. If, however, the associated flip-flop stage operates to the opposite condition so that a positive voltage appears on lead 30, one of the two NAND gates will tend to have its output go to zero voltage first, and if this should be the NAND gate 21, for example, then NAND gate 20 will have a zero voltage input at its input lead 31, thereby causing it to provide a positive voltage output, which positive output then appears at lead 32 of gate 21 so that gate 21 now has both of its inputs positive, thereby ensuring that its output will go to zero and stay there.

With output terminal 33 at zero potential, this terminal is at only a few ohms above ground, whereas terminal 34 comprising the output of NAND gate 20 is then at a substantial resistance above ground as determined by resistor 35. Consequently, there is a flow of current through the primary winding of transformer T1 from left to right, which causes this transformer to saturate, and as soon as it reaches saturation, the effect is the same as if there were a substantial shunt between the input terminals of the primary winding. This abruptly lowers the voltage at output terminal 34 of gate 20 to near zero so that input terminal 32 of gate 21 also goes to zero voltage, terminal 33 goes positive, as does also input terminal 31 of gate 20, with output terminal 34 being driven to zero. Thus, the states of the two gates 20 and 21 are abruptly reversed, and with this reversal in conditions, current now flows through the primary winding of transformer T1 in the opposite direction as before so that another cycle of operation is effected. The above-described operation occurs repetitively, with the two NAND gates alternately reversing their conductive states at a predetermined rate dependent upon the time constants governing the flow of current through the windings of transformer T1. The circuit operates then in much the same manner as a free-running multivibrator.

Because of the multivibrator action of gates 20 and 21, a square-wave of voltage is applied to the gate electrode of thyristor TR1. In a typical embodiment of the invention, the square-wave so produced was found to have a frequency in the order of about 100kHz.

The characteristics of a thyristor are, quite generally, that the thyristor tends to stay on when once triggered to the ON condition. In addition, the thyristor is relatively slow to respond so that it tends to stay on continuously even if the current is interrupted for a very brief time. To trigger a thyristor to the ON condition may require a fairly significant current amplitude through the load or provided to it from the gate electrode, and this amount of current may, in a typical case, be in the order of 10 milliamperes. If the load is such that it cannot maintain the level of current through the thyristor at this level, then the deficiency must be overcome by supplying sufficient current from the gate electrode.

It is quite common in the art to trigger a thyristor by supplying repetitive short pulses to its gate electrode. Hopefully, the circuit conditions are then such that, at the termination of the trigger pulse, enough current is flowing through the thyristor to maintain it in the on condition. One of the disadvantages of using short pulses to turn on a thyristor is that this tends to produce a ragged sine wave output in the alternating-current load, and this may produce transients which can interfere with proper operation of the associated logic circuitry. The reason that a ragged sine wave of current may appear in the output load is that, between the repetitive pulses, the current in the load may go close to or reach zero voltage, with the result that the thyristor will then turn momentarily off and stay off until the next trigger pulse arrives. Such operation of the thyristor may be permissible for some uses such as for controlling the energization of a tungsten lamp, but this is clearly not desirable when the load is an inductive one, for example, since then the counter E.M.F. which is generated in the load will tend to be transferred back into the line and thereby generate unwanted noise. Also, when the load current is quite low, as for example when it is in the order of 3 milliamperes, intermittent pulsing of the thyristor is also not as satisfactory since it will not stay on with such a low load current and instead the deficiency in current must then be supplied from the gate electrode.

These disadvantages are overcome by providing a pulsing input to the gate electrode which comprises a square-wave voltage. Thus, although the gate electrode voltage alternates in polarity, going through zero for each cycle, this does not improperly affect operation of the thyristor since the rate of change of the voltage as it goes through zero is so rapid that the thyristor will not turn off.

The control circuit of this invention makes possible a very close control over the timing of the conductive period of the thyristor so that it may be switched on and off as desired. Thus, whenever the stage of flip-flop 15 which is associated with any particular power switch is operated to the "1" state, the NAND gates 20 and 21 immediately start their cyclical operation, and as soon as this is initiated, a square-wave of alternating voltage is applied to the gate electrode of thyristor TR1 as described above. This turns the thyristor on, and permits current to flow in the secondary winding of transformer T2 in series with load 29 in response to energization of the primary winding of transformer T2 from the alternating-current source. When it is desired to turn off the load, the flip-flop 15 has its appropriate stage operated to the "0" condition which immediately stops the multivibrator action of NAND gates 20 and 21. This removes the square-wave of voltage from the gate electrode of thyristor TR1 and permits thyristor TR1 to turn off as soon thereafter as the current through it goes to a sufficiently low level in its normal cyclical variation so that conduction can no longer be sustained.

FIG. 2 further illustrates one of the significant advantages of the control system of this invention whereby the timing of the control of the thyristor is made to be responsive to the phase of the alternating-current power source. Thus, as illustrated in FIG. 2 at line A, the AC voltage is shown as comprising a conventional sine wave and, at line B, the pulse former 16 and differentiator 17 are shown as producing a pulse substantially at the time that the waveform of the voltage source goes through zero, thereby resulting in two trigger pulses for each complete cycle of the sine wave source.

Line C indicates the condition of, for example, a monitored contact, the lower level at line C indicating the contact in the open position and upper level indicating the contact in the closed position.

As previously mentioned, each stage of flip-flop 15 is controlled to a condition which is responsive to the state of a respective one of the monitored devices only when an appropriate trigger pulse is applied to the flip-flop 15 from pulse former 16. Therefore, referring again to lines C and D, it will be noted that although the monitored contact in line C is shown as closing at time $t_1$, the flip-flop does not operate to the "1" state until time $t_2$ which is coincident with the time of occurrence of a trigger pulse on line B.

Operation of the flip-flop stage 15 to the "1" condition results in a multivibrator type operation of NAND gates 20 and 21 thereby producing a square-wave of input voltage for the gate electrode of thyristor TR1, and this square-wave of voltage is shown at line E as commencing also at time $t_2$. Since this square-wave of voltage turns the thyristor TR1 on, it is apparent that the thyristor becomes conductive at time $t_2$ also or very shortly thereafter dependent upon the delay time of the thyristor, and that a current then commences to flow in the load circuit 29 at time $t_2$.

It is important to note from the foregoing phase relationships that, although the monitored contact may, as shown at line C, be closed anywhere in the cycle of the AC voltage source, the thyristor TR1 is not turned on, nor is current allowed to flow in the load, except at the very instant $t_2$ at which the alternating-current voltage source is at or very close to zero voltage. Initiation of energization of the load at this time ensures the minimum of transients and noise generation irrespective of whether the load has resistive, inductive, or capacitive characteristics.

With respect to the switching off of the thyristor, line C of FIG. 2 shows the monitored contact as being opened at time $t_3$ which, for purposes of illustration, is shown as occurring sometime during the positive half-cycle of the alternating-current voltage source. Although this contact opens at $t_3$, line D shows that the flip-flop does not operate back to the "0" state until time $t_4$ which is coincident with the time of generation of another trigger pulse as shown at line B. Thus, the very next trigger pulse at line B to occur after the contact is opened causes the flip-flop to revert to the "0" state from the "1" state in which it has been previously operating.

With the restoration of flip-flop 15 to the "0" state, the generation of the square-wave of voltage by the intermittent operation of NAND gates 20 and 21 is terminated and this is shown at line E where the square-wave of voltage is shown as terminating at time $t_4$. Assuming, however, that the load is an inductive one so that the current therein lags the voltage of the alternating-current source, it can be seen that a lagging load current is shown at line G compared to the waveform for the voltage of the alternating-current source at line A. Accordingly, the load current is shown as not going to zero amplitude until time $t_5$ which is sometime after $t_4$, and $t_5$ is thus the time at which the current through the load goes to a sufficiently low value so that conduction in the thyristor can no longer be sustained. For this reason, the termination of the output at line F is shown as occurring at this time $t_5$.

From the foregoing description, it can be seen that the initiation and termination of current flow in the load are advantageously selected so as to produce the minimum in the way of transients and noise which may otherwise adversely affect the associated logic circuitry. Thus, the thyristor is turned on in response to a synchronizing signal only when the voltage of the alternating-current source goes through zero, and the thyristor is effectively turned off only when the current through the load itself and thus through the thyristor is at or near zero amplitude.

As mentioned above, each stage of flip-flop 15 has its output connected through a respective diode 22–25 to a reset lead 18 which is connected through a resistor 19 to the (+) voltage source and to which a reset input in the form of a low-level or zero voltage may be applied. In the presence of the reset input, each flip-flop stage output is pulled down to or near zero with the result that the interconnected NAND gates in each power switch become inoperative. This makes it possible to render each switch open so as to establish the initial condition of all loads as being OFF, or to inhibit all the loads at any time as desired.

What I claim is:

1. A system for selectively controlling the energization of at least one load from an alternating-current source in response to a randomly occurring input so that said load is energized only throughout the presence of said input, comprising in combination, a bi-directional thyristor having first and second anodes and a control gate electrode, first circuit means comprising a series-connected arrangement of said alternating-current source, said load, and the anodes of said thyristor, second means responsive jointly to said alternating-current source and to said input for generating an alternating voltage wave having a frequency which is a multiple of the frequency of said source, said second means comprising two NAND gates each having a first and second input and an output, said output of each gate being connected to a first input of the other gate, said second input of each gate being responsive to said input signal, said output of each said gate being connected to a respective opposite terminal of the primary winding of a saturable transformer and each output also being connected to a source of positive voltage, the secondary winding of said saturable transformer being connected in series with the control gate-second anode circuit of said thyristor, said second means initiating the generation of said alternating voltage wave only upon the first occurrence of a polarity reversal in the wave form of said source subsequent to the onset of said randomly occurring input, means for applying said alternating voltage wave to the control gate-second anode circuit of said thyristor, said second means terminating the generation of said alternating voltage wave only upon the first occurrence of a polarity reversal in the wave form of said source subsequent to the termination of said randomly occurring input.

2. The combination of claim 1 in which said second means further includes a bi-stable state flip-flop which is jointly responsive to said alternating-current source and to said input signal, said flip-flop being operated in response to each traversal of the voltage waveform of said source through zero to a respective one of its conditions dependent upon whether said randomly occurring input at such instant is present or absent, said flip-flop when in one of its conditions providing a substantially zero voltage at said second input of each of said gates and in the other of said conditions providing a positive voltage at the second input of each of said gates.

* * * * *